United States Patent
Nikolaev et al.

(10) Patent No.: US 10,785,247 B2
(45) Date of Patent: Sep. 22, 2020

(54) SERVICE USAGE MODEL FOR TRAFFIC ANALYSIS

(71) Applicant: Cisco Technology, Inc., San Jose, CA (US)

(72) Inventors: Ivan Nikolaev, Prague (CZ); Tomas Pevny, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 257 days.

(21) Appl. No.: 15/413,921

(22) Filed: Jan. 24, 2017

(65) Prior Publication Data

US 2018/0212992 A1 Jul. 26, 2018

(51) Int. Cl.
| | |
|---|---|
| *H04L 29/06* | (2006.01) |
| *H04L 12/26* | (2006.01) |
| *H04L 29/08* | (2006.01) |
| *G06N 20/00* | (2019.01) |
| *H04L 12/24* | (2006.01) |

(52) U.S. Cl.
CPC ......... *H04L 63/1433* (2013.01); *G06N 20/00* (2019.01); *H04L 43/04* (2013.01); *H04L 43/0876* (2013.01); *H04L 63/145* (2013.01); *H04L 67/306* (2013.01); *H04L 41/14* (2013.01)

(58) Field of Classification Search
CPC ....... H04W 4/021; G06N 20/00; H04L 41/14; H04L 43/04; H04L 43/0876; H04L 63/1433; H04L 63/145; H04L 67/306
See application file for complete search history.

(56) References Cited

U.S. PATENT DOCUMENTS

| | | |
|---|---|---|
| 8,161,548 B1 | 4/2012 | Wan |
| 8,266,698 B1 | 9/2012 | Seshardi et al. |
| 8,799,190 B2 | 8/2014 | Stokes et al. |
| 9,288,220 B2 | 3/2016 | Raugas et al. |
| 2014/0113588 A1* | 4/2014 | Chekina ................. G06N 20/00 455/410 |

(Continued)

OTHER PUBLICATIONS

Bartos, et al. "Learning Invariant Representation for Malicious Network Traffic Detection", https://www.cs.rpi.edu/~sofka/pdfs/bartos-ecai16.pdf, Accessed on Oct. 25, 2016, 8 pages, www.cs.rpi.edu.

(Continued)

*Primary Examiner* — Trang T Doan
(74) *Attorney, Agent, or Firm* — Behmke Innovation Group LLC; Kenneth J. Heywood; James J. Wong

(57) ABSTRACT

In one embodiment, a device in a network identifies an set of services of a domain accessed by a plurality of users in the network. The device generates a service usage model for the domain based on the set of services accessed by the plurality of users. The service usage model models usage of the services of the domain by the plurality of users. The device trains a machine learning-based classifier to analyze traffic in the network using a set of training feature vectors. A particular training feature vector includes data indicative of service usage by one of the users for the domain and the modeled usage of the services of the domain by the plurality of users. The device causes classification of traffic in the network associated with a particular user by the trained machine learning-based classifier.

17 Claims, 9 Drawing Sheets

(56) References Cited

U.S. PATENT DOCUMENTS

| | | | |
|---|---|---|---|
| 2014/0321290 A1* | 10/2014 | Jin | H04L 47/2441 370/241 |
| 2015/0052606 A1* | 2/2015 | Romero Bueno | H04L 63/1425 726/23 |
| 2015/0215804 A1* | 7/2015 | Ideses | H04L 47/803 370/230 |
| 2016/0042287 A1* | 2/2016 | Eldardiry | H04L 63/14 706/14 |
| 2017/0024660 A1* | 1/2017 | Chen | H04L 63/1433 |
| 2017/0063903 A1* | 3/2017 | Muddu | G06F 16/254 |
| 2017/0063911 A1* | 3/2017 | Muddu | G06F 16/254 |
| 2017/0063912 A1* | 3/2017 | Muddu | H04L 41/0893 |
| 2018/0150635 A1* | 5/2018 | Melvin | H04L 67/104 |
| 2018/0198812 A1* | 7/2018 | Christodorescu | H04L 41/145 |
| 2018/0198838 A1* | 7/2018 | Murgia | H04L 47/2433 |

OTHER PUBLICATIONS

Nikolaev, Ivan "Network Service Anomaly Detection", Master's Thesis, 54 pages, Jun. 2014, Martin Grill, Faculty of Electrical Engineering, Department of Control Engineering, Czech Technical University in Prague.

\* cited by examiner

EXTENDED
USER FEATURES
508

EXTENDED USER 1 BAG

| domain 1 | 1 2 ... 1 2 7 3 (domain 1 representation) |
| ... | |
| domain 1 | 8 3 ... 1 2 7 3 (domain 1 representation) |
| domain 2 | 2 7 ... 2 6 5 3 (domain 2 representation) |
| ... | |
| domain 2 | 4 2 ... 2 6 5 3 (domain 2 representation) |

EXTENDED USER N BAG

| domain 2 | 6 2 ... 2 6 5 3 (domain 2 representation) |
| ... | |
| domain 2 | 8 9 ... 2 6 5 3 (domain 2 representation) |
| domain m | 2 7 ... 8 9 7 1 (domain m representation) |
| ... | |
| domain m | 4 2 ... 8 9 7 1 (domain m representation) |

FIG. 5B

SERVICE USAGE MODEL FOR TRAFFIC ANALYSIS

TECHNICAL FIELD

The present disclosure relates generally to computer networks, and, more particularly, to a service usage model for analyzing traffic in a network.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

Beyond the various types of legitimate application traffic in a network, some network traffic may also be malicious. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5B illustrate examples of a service usage model;

DESCRIPTION OF EXAMPLE EMBODIMENTS

Overview

Figure 1A:
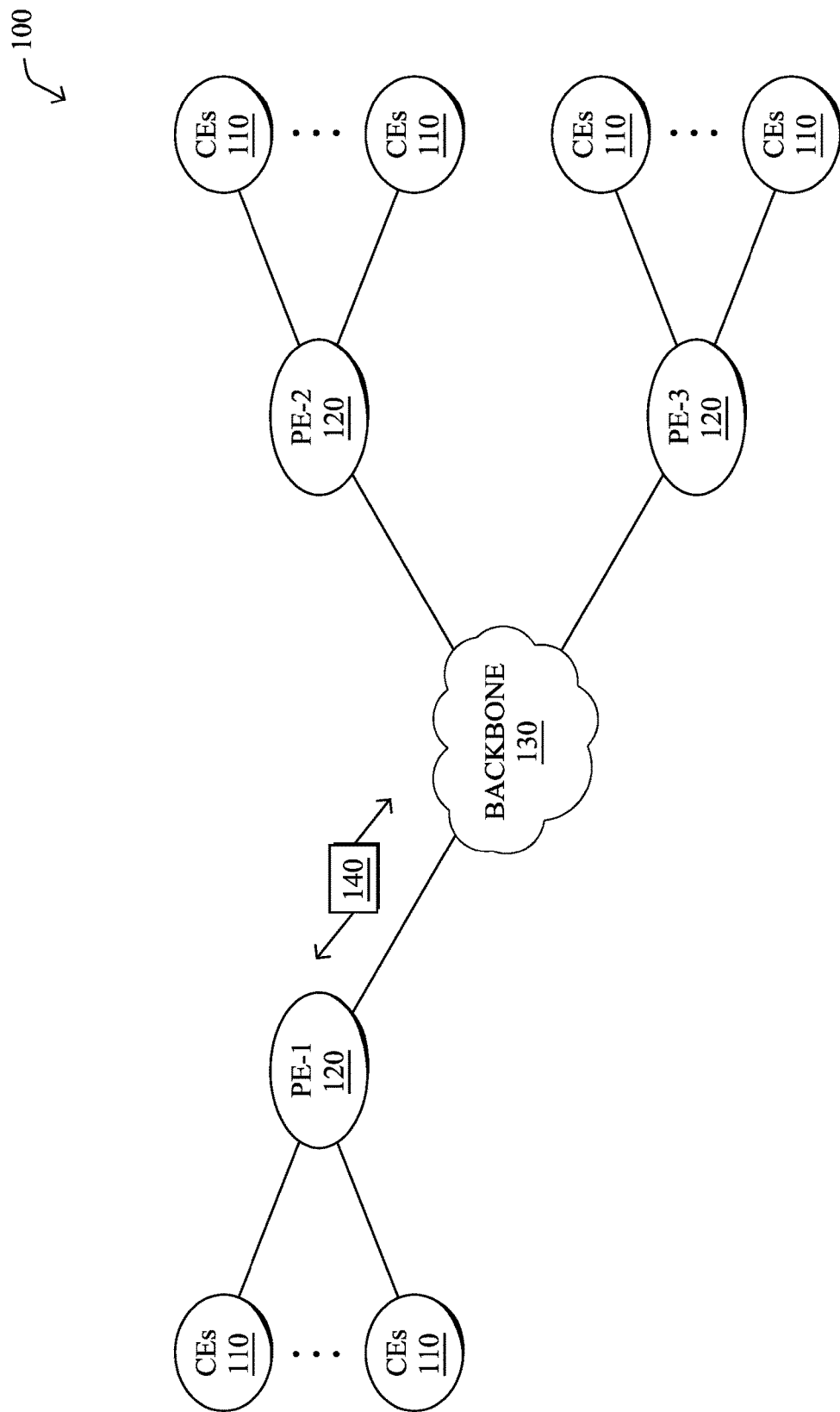
FIGS. 1A-1B illustrate an example communication network.

According to one or more embodiments of the disclosure, a device in a network identifies an set of services of a domain accessed by a plurality of users in the network. The device generates a service usage model for the domain based on the set of services accessed by the plurality of users. The service usage model models usage of the services of the domain by the plurality of users. The device trains a machine learning-based classifier to analyze traffic in the network using a set of training feature vectors. A particular training feature vector includes data indicative of service usage by one of the users for the domain and the modeled usage of the services of the domain by the plurality of users. The device causes classification of traffic in the network associated with a particular user by the trained machine learning-based classifier.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
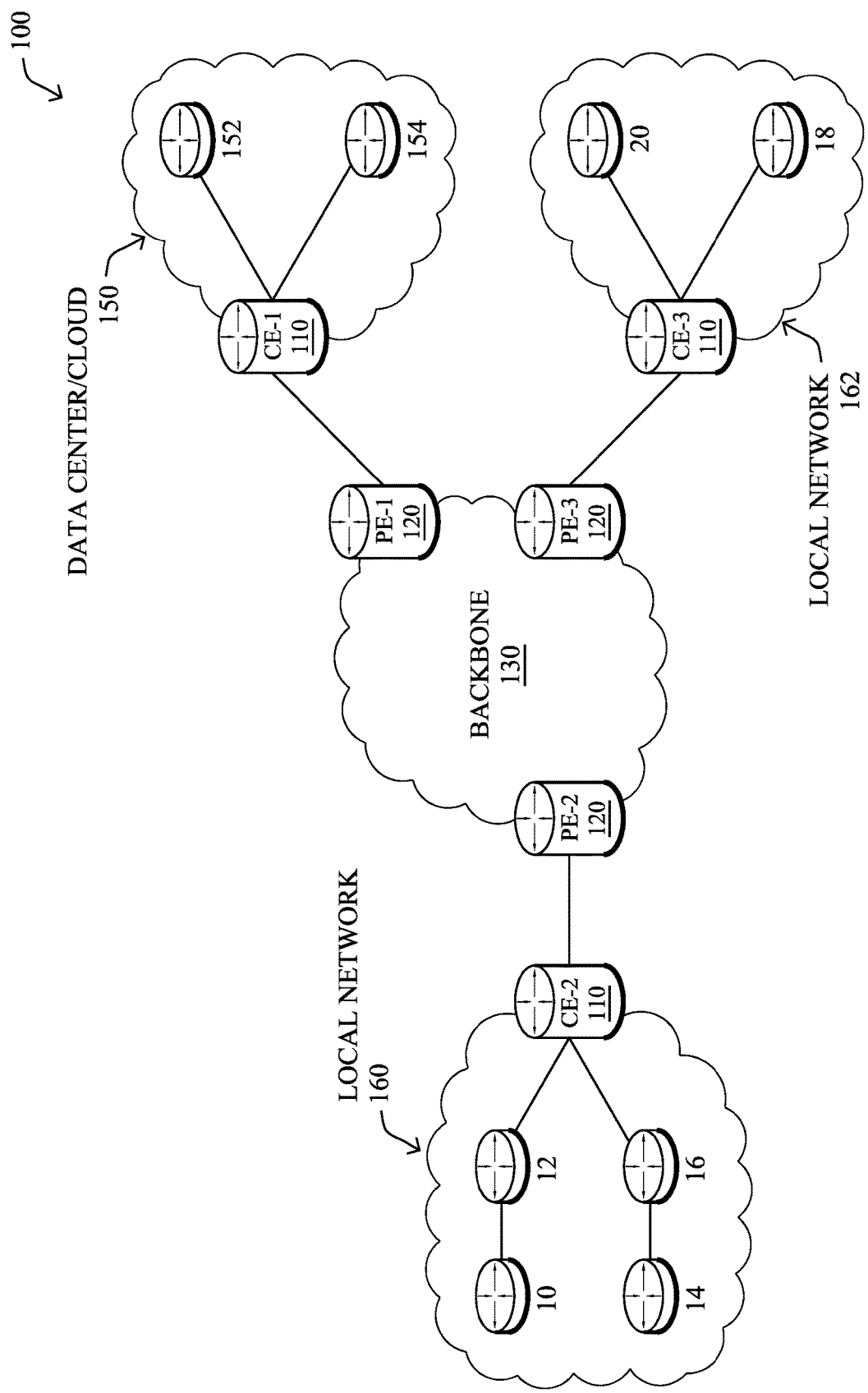

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
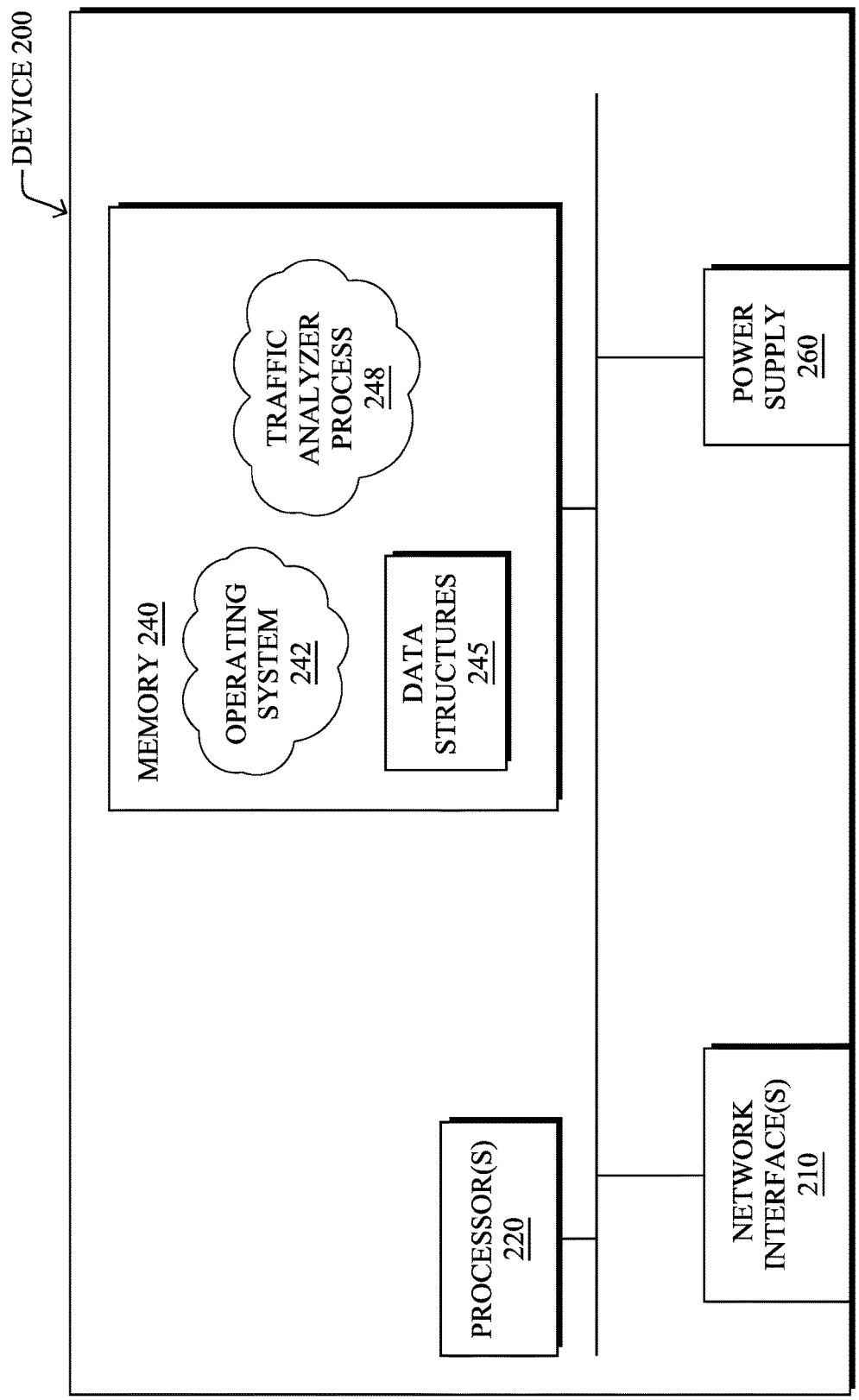
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analyzer process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Traffic analyzer process 248 includes computer executable instructions that, when executed by processor(s) 220, cause device 200 to analyze available information about a traffic flow or set of traffic flows, to discern the traffic flow type(s) of the flow(s) under analysis. In some embodiments, traffic analyzer process 248 may discern between different types of benign traffic flows, such as the various benign applications associated with the flows that may be deployed in the network. In further embodiments, traffic analyzer process 248 may discern between benign and malicious traffic flows and may even identify the specific type of a malicious flow (e.g., the specific family of malware associated with the flow).

Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analyzer process 248 may analyze traffic flow data to detect anomalous or otherwise undesirable behaviors (e.g., malfunctioning devices, misconfigured devices, etc.), traffic pattern changes (e.g., a group of hosts begin sending significantly more or less traffic), or the like.

According to various embodiments, traffic analyzer process 248 may employ any number of machine learning techniques, to assess a given traffic flow in the network. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, traffic analyzer process 248 can use the model M to classify new data points, such as information regarding new traffic flows in the network. Often, M is a statistical model, and the cost function is inversely proportional to the likelihood of M, given the input data.

In various embodiments, traffic analyzer process 248 may employ one or more supervised, unsupervised, or semi-supervised machine learning models to analyze traffic flow data. Generally, supervised learning entails the use of a training dataset, which is used to train the model to apply labels to the input data. For example, the training data may include sample traffic data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analyzer process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analyzer process 248 may assess the captured traffic data on a per-flow basis. In other embodiments, traffic analyzer process 248 may assess traffic data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
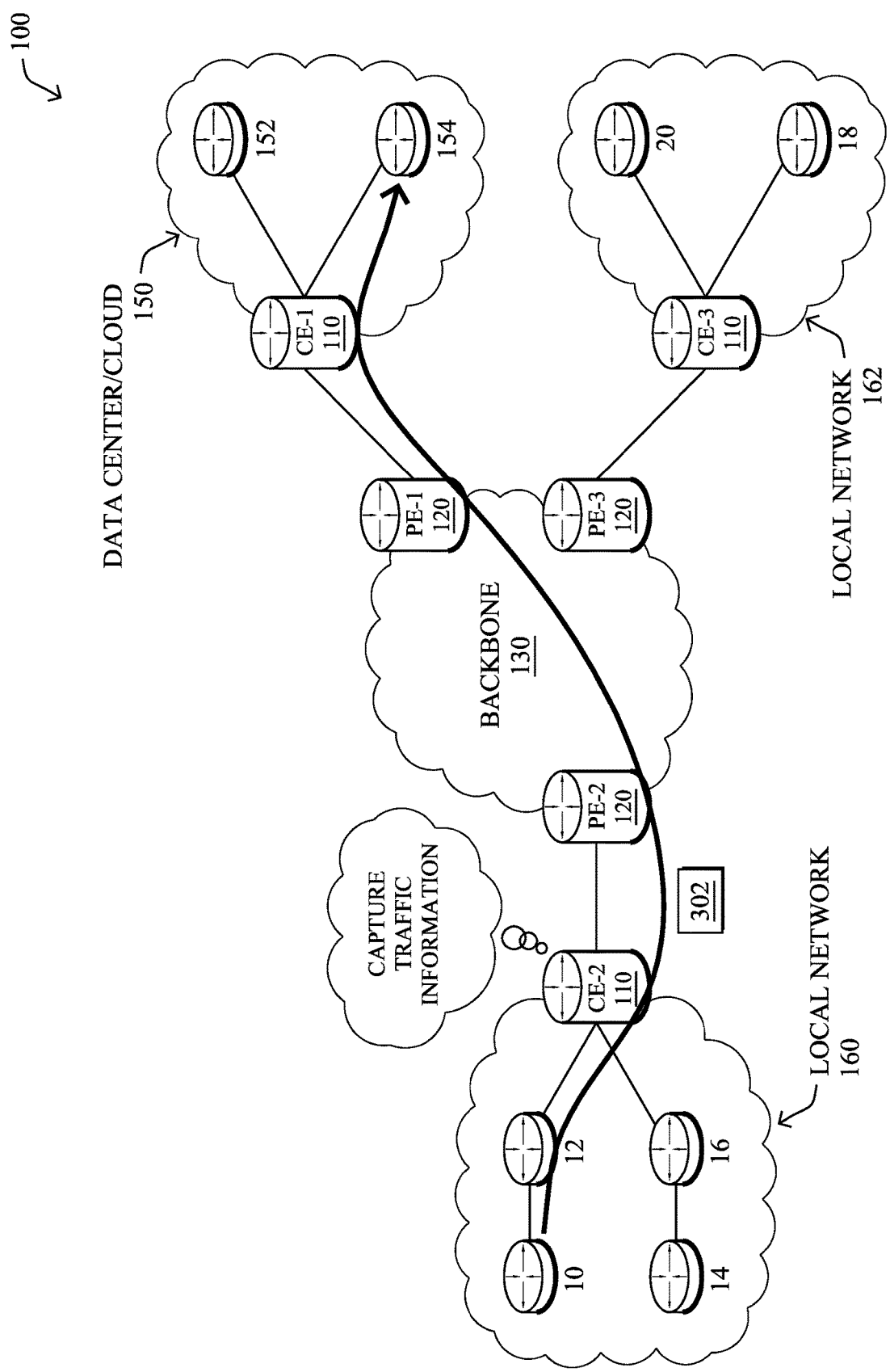
FIG. 3 illustrates an example of a network device capturing traffic data.

As shown in FIG. 3, various mechanisms can be leveraged to capture information about traffic in a network. For example, consider the case in which client node 10 initiates a traffic flow with remote server 154 that includes any number of packets 302. Any number of networking devices along the path of the flow may analyze and assess packet 302, to capture traffic data regarding the traffic flow. For example, as shown, consider the case of edge router CE-2 through which the traffic between node 10 and server 154 flows. While the packets 302 flow through edge router CE-2, router CE-2 may capture traffic data regarding the flow. Notably, traffic flows can be monitored in many cases through the use of a tap or Switch Port Analyzer (SPAN).

In some embodiments, a networking device may analyze packet headers, to capture information about the traffic flow. For example, router CE-2 may capture the source address and/or port of host node 10, the destination address and/or port of server 154, the protocol(s) used by packet 302, or other header information by analyzing the header of a packet 302. In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the traffic data may also compute any number of statistics or metrics regarding the traffic flow. For example, CE-2 may determine the start time, end time, duration, packet size(s), the distribution of bytes within a flow, etc., associated with the traffic flow by observing packets 302.

In the specific case of encrypted traffic, the networking device that captures the traffic data may also be a proxy device, in some embodiments. For example, CE-2 or another intermediary device may act as a man-in-the-middle between endpoints, to intercept the encryption credentials used and simulate responses from each respective node. In doing so, the device may be able to decrypt and analyze the payloads of the packets. Alternatively, in further embodiments, the device may simply capture header information from encrypted traffic, such as Transport Layer Security (TLS) header information.

Figure 4:
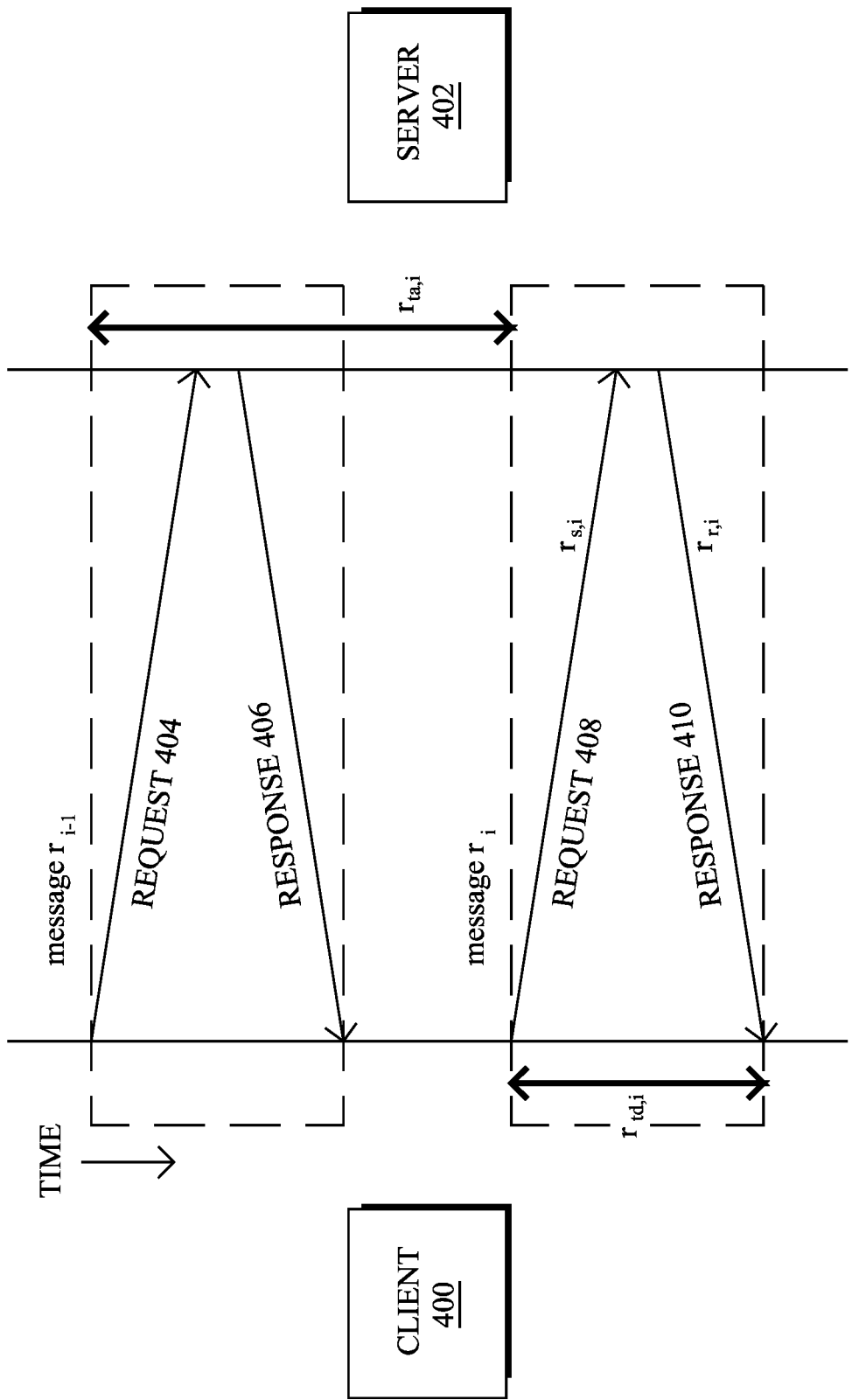
FIG. 4 illustrates an example of observed messages between a client and a server.

FIG. 4 illustrates an example of observed messages exchanged between a client 400 and a server 402, in accordance with various embodiments herein. As shown, client 400 and server 402 may exchange any number of messages that may comprise a request and/or a response. For example, individual messages/traffic exchanged between client 400 and server 402 may include, but are not limited to, HTTP(S) request-response pairs, a single TCP or UDP communication, a NetFlow message, or any other type of network traffic.

An intermediate device located along the path between client 400 and server 402 (e.g., a CE router 110, a cloud service device, a NetFlow or IPFIX generation appliance, etc.) may capture various traffic data regarding the traffic between client 400 and server 402. Notably, such an intermediate device may capture traffic data regarding the $i^{th}$ message exchange, $r_i$, between client device 400 and server 402. Message $r_i$ may comprise a request 408 sent from client 400 to server 402 and a response 410 sent from server 402 to client 400. Similarly, the prior message, $r_{i-1}$, may include a request 404 and a response 406.

The intermediate device between client 400 and server 402 may capture any or all of the following traffic data characteristics regarding message $r_i$:

The number of bytes in request 408 ($r_{s,i}$),
The number of bytes in response 410 ($r_{r,i}$),
The time duration of the request-response (R-R) loop of message $r_i$ ($r_{td,i}$),
The inter-arrival time between when client 400 sent request 404 of message $r_{i-1}$ and when client 400 sent request 408 of message $r_i$ ($r_{ta,i}$), and/or
Header information or any other information available from requests or responses 404-410, themselves.

The intermediate device between client 400 and server 402 may also capture other features regarding the traffic, as well, in further embodiments.

As noted above, malware-related traffic may be used to exfiltrate data from an infected system, pass control commands to the infected system (e.g., as in the case of botnets), or perform other malicious functions. Unfortunately, malware is becoming increasingly more sophisticated and may current forms of malware attempt to conceal their malicious traffic. For example, in some cases, malware may make use of TLS encryption to encrypt its traffic and prevent or hinder the performance of DPI on the traffic. In further cases, malware may conceal its traffic among benign traffic.

Beyond malware itself, some traffic may still be considered malicious due to the actions of the corresponding user. For example, while some malware may be able to exfiltrate data from an infected system, data can just as easily be exfiltrated by a disgruntled employee or other malicious user. Like malware-related traffic, traffic from a malicious user may be intermixed with benign traffic, making its detection equally challenging.

Service Usage Model for Traffic Analysis

The techniques herein allow for the creating of a service usage model that models user behavior regarding online services of a domain. In some aspects, the service usage model can be used to enhance the training dataset of a machine learning-based classifier, such as a classifier trained to detect malware-related traffic in a network.

Specifically, according to one or more embodiments of the disclosure as described in detail below, a device in a network identifies an set of services of a domain accessed by a plurality of users in the network. The device generates a service usage model for the domain based on the set of services accessed by the plurality of users. The service usage model models usage of the services of the domain by the plurality of users. The device trains a machine learning-based classifier to analyze traffic in the network using a set of training feature vectors. A particular training feature vector includes data indicative of service usage by one of the users for the domain and the modeled usage of the services of the domain by the plurality of users. The device causes classification of traffic in the network associated with a particular user by the trained machine learning-based classifier.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Figure 5A:
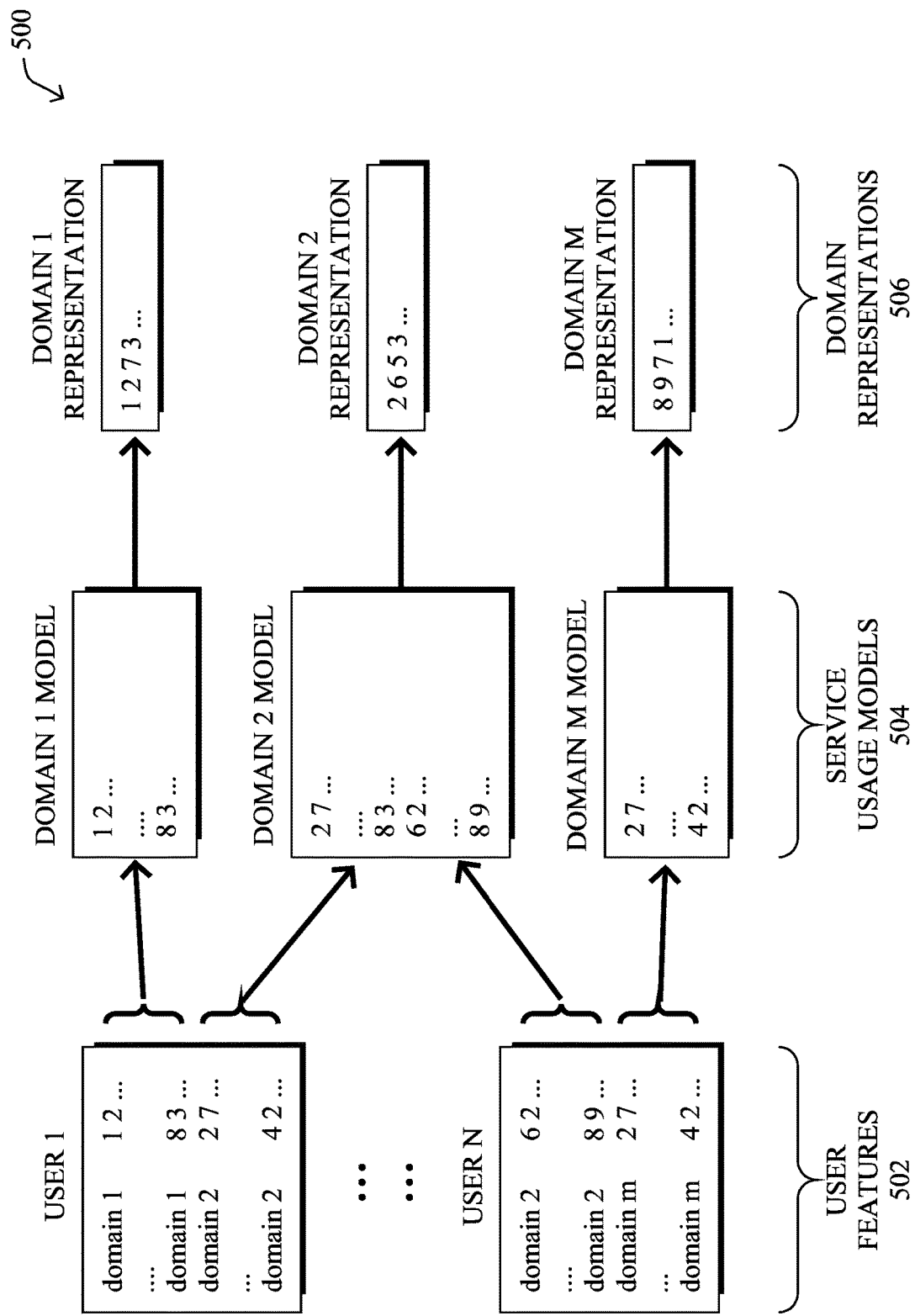

Operationally, FIGS. 5A-5B illustrate examples of a service usage model, according to various embodiments. In general, an online service is offered by a server that passively waits for an incoming message from a client, before communicating with the client. For example, in the case of malware for a botnet, a typical client may use a domain generation algorithm (DGA) to make contact with a C2 server by attempting contact via any number of DGA-generated domains. Typically, an endpoint of such an exchange may be represented by its tuple comprising its IP address, port, and protocol in use during the exchange.

Any number of different types of services may be available in a network and the number and types of services are continually growing. For example, services offered by a particular domain may include, but are not limited to, HTTPS services, HTTP services, Remote Desktop Protocol (RDP) services, Domain Name System (DNS) services, Secure Shell (SSH) services, Simple Mail Transfer Protocol (SMTP) services, MySQL services, combinations thereof, and the like.

According to various embodiments, as shown in the example 500 in FIG. 5A, traffic analyzer process 248 may first identify the service usage features 502 for each of a plurality of users in the network. For example, a first user ("user 1") may access a set of services for a first domain ("domain 1"), the traffic of which having any number of observed features/characteristics (e.g., in terms of byte size, durations, header information, etc.). Similarly, the first user may access a set of services for a second domain ("domain 2"), etc. As a result, there may be up to n-number of sets or "bags" of features or "instances," as they are sometimes called in the art, representing the service usages by each of n-number of users.

Also as shown, traffic analyzer process 248 may use the user features 502 to generate service usage models 504 for the m-number of domains indicated user features 502. In various embodiments, to generate the service usage model for a given domain, traffic analyzer process 248 may aggregate the features 502 for the domain into a representation of the usage of the service(s) of the domain across all of the users. For example, a basic service usage model for a particular service may be constructed by taking the mean of all the feature vectors across all users of the service. More advanced models can also be implemented, e.g. using quantiles, probability distributions, or more advanced representations of the usage of the domain's service by the users.

As a result of the service usage models 504, each of the m-number of domains may be represented by the resulting domain representations 506. In various cases, domain representations 506 may be feature vectors that include the representative characteristics of the usage of the domain's services across all of the n-number of users.

As shown in FIG. 5B, traffic analyzer process 248 may use the domain representations 506 to extend the feature spaces of the individual users. In particular, process 248 may concatenate the feature vectors that represent the various domains (e.g., domain representations 506) with the original features 502 for each user, to form extended user features 508. For example, as shown, the feature vectors for the first user that are associated with the first domain may be extended with the feature vector representation of the first domain from the corresponding service usage model 504. Similarly, the feature vectors for the first user that are associated with the second domain may be extended with the feature vector representation of the second domain from the service usage model. In this manner, each user "bag" has a set of instances/feature vectors that have been extended to also include the modeled service usages across all of the users.

In various embodiments, traffic analyzer process 248 may use the extended user features 508 to train a machine learning-based traffic classifier. For example, such a classifier may use the modeled service usages of all of the users as a reference, when determining whether the traffic associated with a particular user is malicious. In other words, the service usage model(s) 504 give the classifier additional context about the normal usage of each service by all of the users, in addition to information about the usage of the service by any particular user. This gives the classifier crucial information, particularly when malware uses common services for malicious purposes, e.g., connection checks to Google or another popular domain. It also gives the classifier information about services whose usage patterns are malware-like across all users.

In some cases, the classifier may be a neural network-based classifier that is trained using two levels of bagging, bags and sub-bags, based on the extended feature space. The same approach, however, can be applied to more traditional one-level bag classifiers, as well. In one embodiment, the classifier may be trained using multiple instance learning. For example, the traffic classifier can be trained by sampling the instances across different bags from several distinct distributions that can be modelled by grouping those instances together, learning the properties of the distribution for those instances, and using the learned properties to enhance the feature space and improve the machine learning task.

In many cases, the classifier trained by traffic analyzer process 248 may be operable to apply a label/classification to traffic associated with an individual user or user device. For example, the classifier may deem the traffic for a particular user or device as "malicious" or "benign" based in part on the service usage characteristics in the traffic. In another example, the classifier may deem the traffic as "malware-related" if, for example, the service usage indicated by the traffic differs significantly from that of the full set of network users.

The results of the classifier may be used to cause a mitigation action to be performed in the network. For example, if a given user's traffic is classified as "malicious" or "malware-related," the device executing the classifier may generate an alert (e.g., to the user, a network administrator, etc.), may cause the user's traffic to be treated differently by the network (e.g., by blocking the traffic, by rerouting the traffic, by imposing additional scrutiny on the traffic, etc.), or take any other appropriate mitigation measures. As would be appreciated, the classifier may also be executed on the device that trains the classifier and/or deployed to any number of nodes in the network for execution (e.g., routers, switches, servers, etc.).

Figure 6:
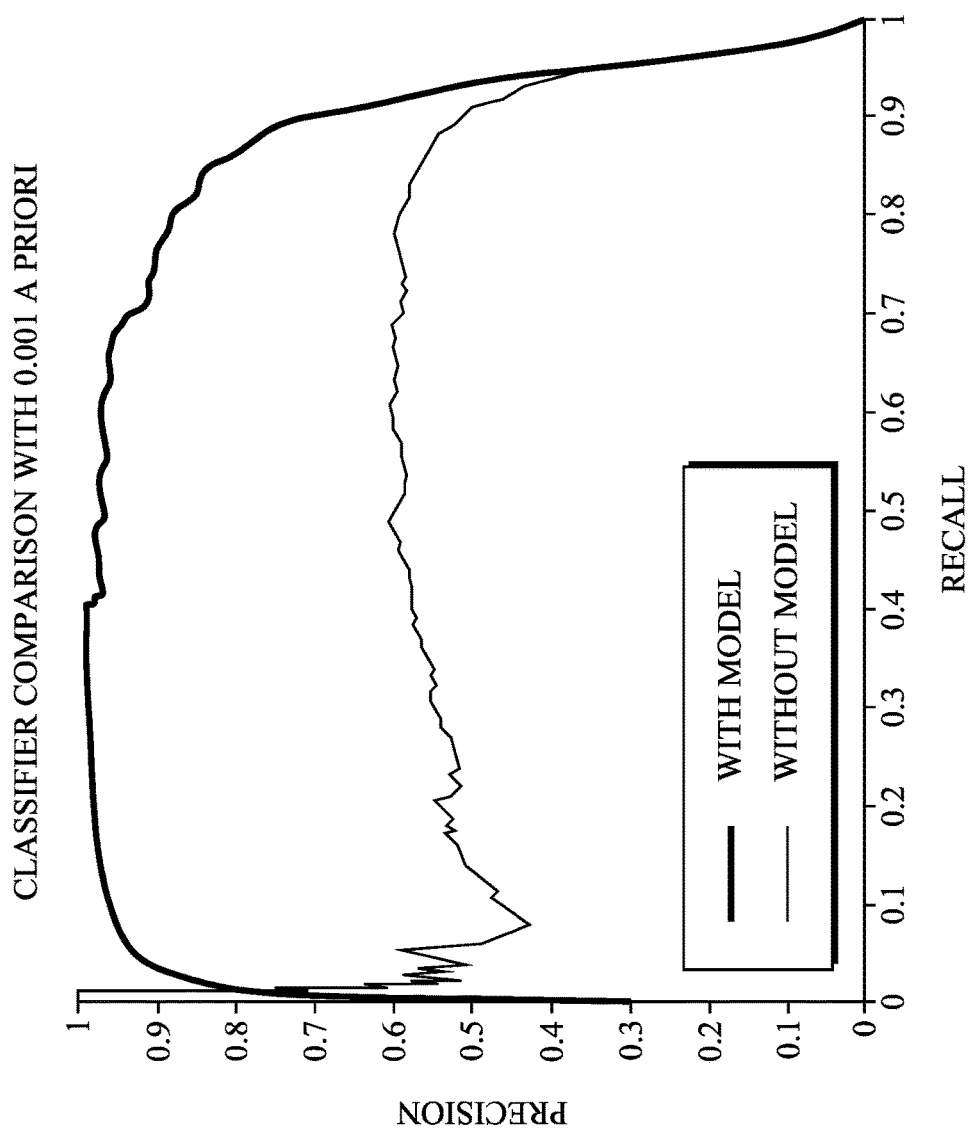
FIG. 6 illustrates a plot of precision vs. recall for a traffic classifier trained using the techniques herein.

A preliminary test was performed using the techniques herein, the results of which are shown in plot 600 of FIG. 6. During the test, a first classifier was trained using the user-specific service usage information available, but without a service usage model that models the usage across all users. A second classifier was also trained using a feature space extended using the domain representations from a service usage model, in accordance with the techniques herein. The traffic used for both training datasets included both known malware-related traffic and benign traffic, thus labeling the training features, accordingly.

Plot 600 illustrates the resulting precious vs. recall curves for both classifiers from the preliminary tests. From plot 600, it can be seen that the classifier trained using the service usage model greatly outperformed the classifier that was not trained using the model, in terms of overall precision.

Figure 7:
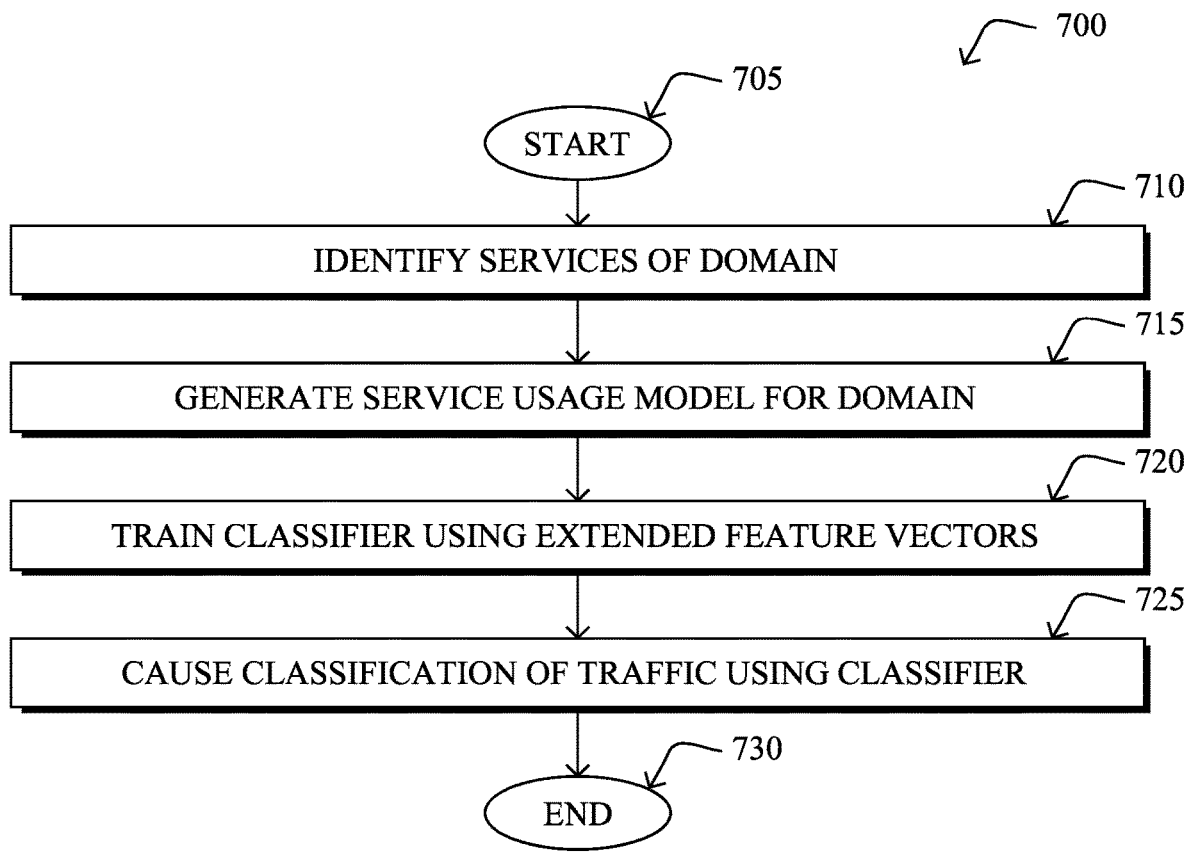
FIG. 7 illustrates an example simplified procedure for using a service usage model to train a traffic classifier.

FIG. 7 illustrates an example simplified procedure for using a service usage model to train a traffic classifier in a network, in accordance with one or more embodiments described herein. For example, a non-generic, specifically configured device (e.g., device 200) may perform procedure 700 by executing stored instructions (e.g., process 248). The procedure 700 may start at step 705, and continues to step 710, where, as described in greater detail above, the device may identify an set of services of a domain accessed by a plurality of users in the network. For example, in the case of the Google domain, users may access HTTP services, HTTPS services, mail services, or any number of other services. In some cases, the device itself may capture the traffic information used to identify the services (e.g., NetFlow or IPFIX records, proxy records, packets, etc.). In other cases, the device may receive the captured traffic information from one or more other nodes in the network (e.g., routers, switches, record generation appliances, etc.).

At step 715, as detailed above, the device may generate a service usage model for the domain based on the set of services accessed by the plurality of users. In general, the service usage model models usage of the services of the domain by the plurality of users. For example, such a model may output a feature vector of the characteristics of the service usages across all of the set of users. In one embodiment, the device may generate the model in part by calculating a mean of the usage of the particular service by the plurality of users. In further embodiments, the model may be based on quartiles and/or probability distributions from the observed service usages across the pool of users.

At step 720, the device may train a machine learning-based classifier to analyze traffic in the network using a set of training feature vectors, as described in greater detail above. In various embodiments, the feature space used to train the classifier may be extended to include the information from the service usage model for the domain. For example, a particular training feature vector may include traffic data indicative of service usage by one of the users for the domain, as well as the modeled usage of the services of the domain by the plurality of users. By including the modeled service usage information in the training dataset, the precision of the resulting traffic classifier may be improved considerably. The classifier may also be of any known form of machine learning-based classifier. For example, in some cases, the classifier may be a neural network-based classifier that is trained using multiple instance learning.

At step 725, as detailed above, the device may cause the classification of traffic in the network associated with a particular user in the network by the trained classifier from step 720. In some cases, the device itself may execute the classifier, to classify the user's traffic. In other cases, the device may deploy the classifier to one or more other nodes in the network, to perform the classification. For example, based in part on the characteristics of the service usage in the user's traffic, the classifier may flag the traffic as malicious or benign. In turn, the executor of the classifier may take any number of mitigation actions, such as generating alerts, etc., based on the classification. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, extend the training space for a traffic classifier using a service usage model. From preliminary testing, it has been shown that doing so greatly improves the precision of the classifier.

While there have been shown and described illustrative embodiments that provide for the use of a service usage model to train a traffic classifier for traffic analysis, it is to be understood that various other adaptations and modifications may be made within the spirit and scope of the embodiments herein. For example, while certain embodiments are described herein with respect to using certain types of machine learning models, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   identifying, by a device in a network, a set of services of a domain accessed by a plurality of users in the network;
   calculating, by the device and for a particular one of the services of the domain, a mean of usage of the particular service by the plurality of users;
   generating, by the device and based on the identified set of services accessed by the plurality of users, a service usage model for the domain by aggregating features for each of the plurality of users and using the calculated mean, wherein the features represent usage of the services of the domain by the plurality of users;

training, by the device, a machine learning-based classifier to analyze traffic in the network using a set of training feature vectors, wherein a particular training feature vector of the set of training feature vectors includes: (a) data indicative of service usage by a particular user of the plurality of users for the domain and (b) the service usage model that models usage of the services of the domain by the plurality of users; and causing, by the device, classification of the traffic in the network associated with the particular user by using the trained machine learning-based classifier.

2. The method as in claim 1, further comprising:

causing, by the device, performance of a mitigation action in the network based on the classification of the traffic associated with the particular user, wherein the network traffic is classified by the classifier as indicative of malware.

3. The method as in claim 1, further comprising:

capturing, by the device, data regarding traffic associated with the plurality of users, wherein the device identifies the set of services from the captured traffic data.

4. The method as in claim 1, further comprising:

receiving, at the device, captured data regarding traffic associated with the plurality of users, wherein the device identifies the set of services from the captured traffic data.

5. The method as in claim 1, wherein generating the service usage model comprises:

calculating, by the device and for a particular one of the services of the domain, a probability distribution or a set of quantiles for the usage of the particular service by the plurality of users.

6. The method as in claim 1, wherein causing, by the device, classification of the traffic in the network associated with the particular user in the network comprises:

sending, by the device, the machine learning-based classifier to a node in the network that executes the machine learning-based classifier.

7. The method as in claim 1, wherein causing, by the device, classification of the traffic in the network associated with the particular user in the network comprises:

executing, by the device, the machine learning-based classifier.

8. The method as in claim 1, wherein the machine learning-based classifier is neural network-based classifier, further wherein training the machine learning-based classifier comprises:

using, by the device, multiple instance learning on the training feature vectors to train the neural network-based classifier.

9. An apparatus, comprising:

one or more network interfaces to communicate with a network;

a processor coupled to the network interfaces and configured to execute one or more processes; and a memory configured to store a process executable by the processor, the process when executed operable to:

identify a set of services of a domain accessed by a plurality of users in the network;

calculate, for a particular one of the services of the domain, a mean of usage of the particular service by the plurality of users;

generate, based on the identified set of services accessed by the plurality of users, a service usage model for the domain by aggregating features for each of the plurality of users and using the calculated mean, wherein the features represent usage of the services of the domain by the plurality of users;

train a machine learning-based classifier to analyze traffic in the network using a set of training feature vectors, wherein a particular training feature vector of the set of training feature vectors includes: (a) data indicative of service usage by a particular user of the plurality of users for the domain and (b) the service usage models that model that models usage of the services of the domain by the plurality of users; and cause classification of traffic in the network associated with the particular user by using the trained machine learning-based classifier.

10. The apparatus as in claim 9, wherein the process when executed is further operable to:

cause performance of a mitigation action in the network based on the classification of the traffic associated with the particular user, wherein the network traffic is classified by the classifier as indicative of malware.

11. The apparatus as in claim 9, wherein the process when executed is further operable to:

capture data regarding traffic associated with the plurality of users, wherein the apparatus identifies the set of services from the captured traffic data.

12. The apparatus as in claim 9, wherein the process when executed is further operable to:

receive captured data regarding traffic associated with the plurality of users, wherein the apparatus identifies the set of services from the captured traffic data.

13. The apparatus as in claim 9, wherein the apparatus generates the service usage model by:

calculating, for a particular one of the services of the domain, a probability distribution or a set of quantiles for the usage of the particular service by the plurality of users.

14. The apparatus as in claim 9, wherein the apparatus causes classification of the traffic in the network associated with the particular user by:

sending the machine learning-based classifier to a node in the network that executes the classifier.

15. The apparatus as in claim 9, wherein the apparatus causes classification of the traffic in the network associated with the particular user by:

executing, by the apparatus, the machine learning-based classifier.

16. The apparatus as in claim 9, wherein the machine learning-based classifier is neural network-based classifier, further wherein the apparatus trains the machine learning based classifier by:

using multiple instance learning on the training feature vectors to train the neural network-based classifier.

17. A tangible, non-transitory, computer-readable medium storing program instructions that cause a device in a network to execute a process comprising:

identifying, by the device, a set of services of a domain accessed by a plurality of users in the network;

calculating, by the device and for a particular one of the services of the domain, a mean of usage of the particular service by the plurality of users;

generating, by the device and based on the identified set of services accessed by the plurality of users, a service usage model for the domain by aggregating features for each of the plurality of users and using the calculated mean, wherein the features represent usage of the services of the domain by the plurality of users;

training, by the device, a machine learning-based classifier to analyze traffic in the network using a set of training feature vectors, wherein a particular training feature vector of the set of training feature vectors includes: (a) data indicative of service usage by a particular user of the plurality of users for the domain and (b) the service usage model that model that models usage of the services of the domain by the plurality of users; and causing, by the device, classification of traffic in the network associated with the particular user by using the trained machine learning-based classifier.

* * * * *